United States Patent
Lisec

[19]

[11] Patent Number: 5,878,866
[45] Date of Patent: Mar. 9, 1999

[54] DEVICE FOR CONVEYING GLASS PLATES

[76] Inventor: Peter Lisec, Bahnhofstrasse 34, A-3363 Amstetten-Hausmening, Austria

[21] Appl. No.: 716,156
[22] PCT Filed: Feb. 2, 1996
[86] PCT No.: PCT/AT96/00016
   § 371 Date: Sep. 13, 1996
   § 102(e) Date: Sep. 13, 1996
[87] PCT Pub. No.: WO96/38360
   PCT Pub. Date: Dec. 5, 1996

[30] Foreign Application Priority Data

May 29, 1995 [AT] Austria ........................................ 900/95

[51] Int. Cl.⁶ .................................................... B65G 45/18
[52] U.S. Cl. .............................................................. 198/496
[58] Field of Search ...................................... 198/494, 496

[56] References Cited

U.S. PATENT DOCUMENTS

| | | | |
|---|---|---|---|
| 1,431,770 | 10/1922 | Ayres | 198/496 X |
| 2,974,631 | 3/1961 | Thompson | 198/496 X |
| 3,139,975 | 7/1964 | Schaefer | 198/496 |
| 3,957,155 | 5/1976 | Enchelmaier | 198/496 |
| 5,533,609 | 7/1996 | Hulse | 198/626.1 X |

FOREIGN PATENT DOCUMENTS

| | | |
|---|---|---|
| 1 596 530 | 9/1969 | Germany . |
| 36 41 159 | 6/1988 | Germany . |
| 43 05 826 | 10/1993 | Germany . |
| 3-46917 | 2/1991 | Japan ........................................ 198/496 |
| 1 381 343 | 1/1975 | United Kingdom . |

*Primary Examiner*—James R. Bidwell
*Attorney, Agent, or Firm*—Young & Thompson

[57] ABSTRACT

Belt brush (30) which engages the bottom of glass plate (10) to remove lubricant or other impurities is assigned to edge (24) of glass cutting table (20), the edge which is forward relative to the conveyor direction (arrow 11), in which table there are several conveyor belts (25) which transport glass plate (10) to be cut. Upper strand (37) of continuous brush belt (35) of belt brush (30), the strand which engages the bottom of glass plate (10), removes lubricant from the bottom of the glass plate so that the lubricant can be captured and disposed of on one end of belt brush (30) in tank (50) which can be pressurized with negative pressure.

9 Claims, 2 Drawing Sheets

DEVICE FOR CONVEYING GLASS PLATES

BACKGROUND OF THE INVENTION

The invention relates to a device with the features of the introductory part of claim 1.

In the flat glass industry the problem often arises of transporting glass plates, for which among others transport rollers, conveyor rolls, and continuous conveyor belts are used, on which the glass plates rest. Conveyor belts are provided for example also in glass cutting tables, often there being several conveyor belts which are admitted into the plate of the glass cutting table and which extend parallel to one another.

Since float glass is coated with a lubricant for reasons of manufacture, it is not easy to transfer the delay and acceleration forces which occur during transport of glass plates from the conveyor belt or conveyor belts to the glass plates. This leads to the conveyor belts sliding through at the start of a conveyor process, therefore when the glass plates accelerate, and to the glass plate not being braked quickly enough and stopped precisely at the end of the conveyor process so that it can happen that it slips against the system parts and damages them and/or is itself damaged.

DESCRIPTION OF THE RELATED ART

It has already been proposed that the conveyor belts which engage the glass plates be cleaned, an approach which however has not achieved the objective, since the surfaces of the conveyor belts which are made rough or otherwise to increase friction cannot be effectively cleaned and a host of conveyor belts is affected.

Removing the lubricant from the glass plates on their side facing the conveying means using a brush roller which turns around an axis which extends transversely to the transport direction is also known. In this case the removed lubricant is however uncontrollably swirled by the brush. In particular, when the rear edge of the glass plate moves over the brush roller, the aforementioned swirling of the lubricant occurs to an especially pronounced degree, since the brush roller is then no longer completely covered by the glass plate.

SUMMARY OF THE INVENTION

The object of the invention is to devise a conveying device for glass plates which solves the aforementioned problems and which ensures reliable friction between the glass plate and the conveyor belt.

According to the invention this object is achieved with the features of the characterizing part of independent claim 1.

Preferred and advantageous embodiments of the device according to the invention are the subject matter of the subclaims.

BRIEF DESCRIPTION OF THE DRAWINGS

Other details and advantages of the invention follow from the following description of one embodiment of the invention in which reference is made to the drawings.

DESCRIPTION OF THE PREFERRED EMBODIMENTS

Figure 1:
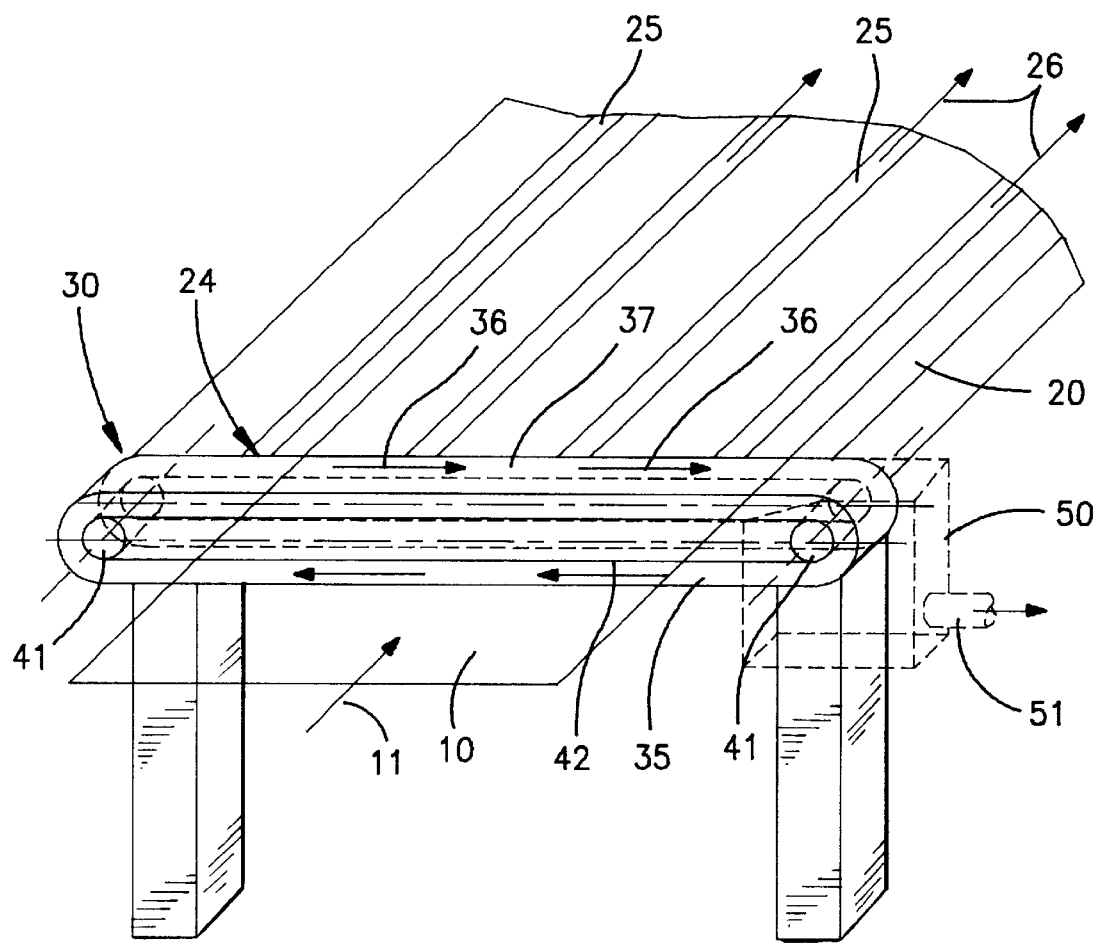
FIG. 1 schematically shows in an oblique view a glass plate conveyor device.

The conveyor device shown in FIG. 1 for glass plate 10 is integrated for example in a glass cutting table and consists of support surface 20 for the glass plate 10, in support surface 20 there being several continuous conveyor belts 25 (only suggested in FIG. 1) which run parallel to one another and which can optionally be lowered under the upper surface of support surface 20.

The strands of conveyor belts 25, strands which are provided in support surface 20, move here in the direction of arrows 26, i.e., in the same direction as glass plate 10 is delivered (arrow 11). Glass plate 10 was for example removed using a crane-like means from a glass bed, laid flat using a tilt table, and moved immediately from the latter to glass cutting table 20.

In front of edge 24 of support surface 20 of the glass cutting table, the edge which is forward viewed in the conveyor direction (arrow 11) there is belt brush 30 which has continuous brush belt 35 which carries brushes which point to the outside and which are attached to a continuous carrier, and which moves in the direction of arrows 36. Brush belt 35 is aligned such that its upper strand 37 engages the bottom of glass plate 10 and moves transversely to conveyor direction 11 or 26.

Using belt brush 30 lubricant adhering to the bottom of glass plate 10 is removed to such an extent that friction sufficient for reliable transport of glass plate 10 including the acceleration and deceleration processes is ensured between conveyor belts 25 and glass plate 10.

Figure 3:
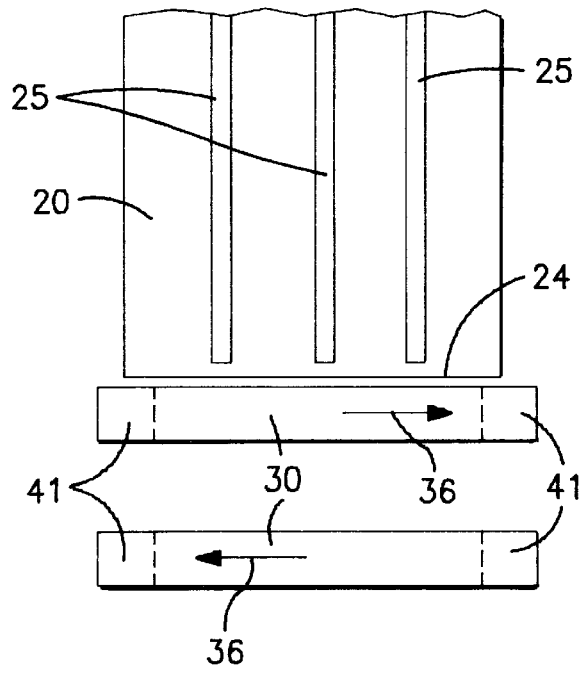
FIGS. 3 and 4 show embodiments with several brushes in an overhead view.
Figure 4:
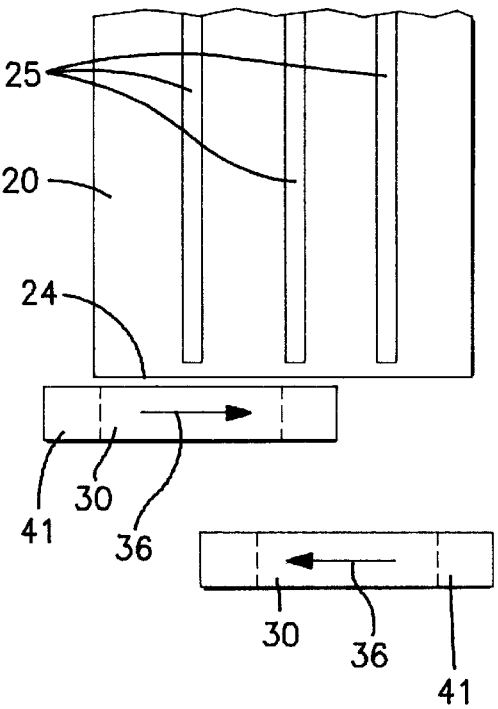

If necessary, in the conveyor direction there can be several belt brushes 30 in succession (FIG. 3). It is also possible to provide shorter belt brushes 30 which are offset to one another and overlap one another (FIG. 4) so that lubricant is removed from the entire width of the bottom of glass plate 10.

Figure 2:
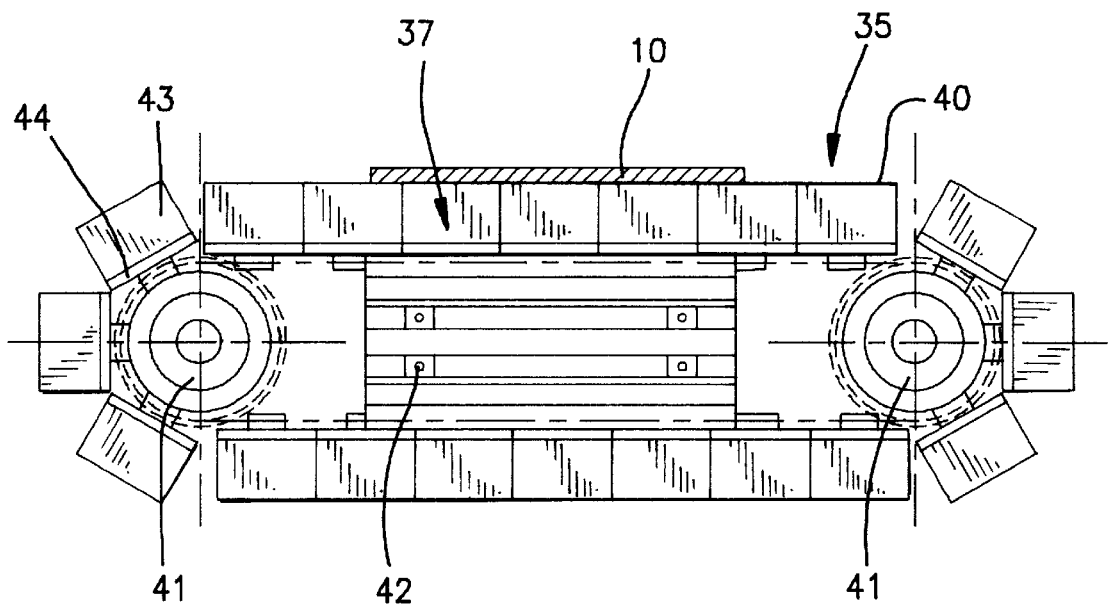
FIG. 2 shows in a side view a cleaning brush in the form of a conventional belt brush.

One specific embodiment of belt brush 30 as is known (Mink brushes, manufacturer August Mink KG) is shown in FIG. 2 (taken from brochure "Your modules for transverse brushing and transport: the innovative Mink chain systems.").

The preferably used embodiment of belt brush 30 shown in FIG. 2 consists of continuous roller chain 40 which is guided via two chain wheels 41. The straight strands of roller chain 40 are guided on guide rail 42 which is attached to the machine frame, for example, to the frame of the glass cutting table.

The bristles or bristle tufts 43 are carried by brush segments 44 which are attached to roller chain 40. Here the dimensions of each brush segment 44 are selected such that brush segments 44 in the straight section of belt brush 30 lie tightly against one another.

The use of at least one belt brush 30 according to the invention to clean the surface of glass plate 10 facing one conveyor means also offers the advantage that lubricant and/or other impurities removed from glass plate 10 always end up on one end of belt brush 30 and can be for example, collected, exhausted and disposed of there.

This is an advantage over vertical brushes, roller brushes or brush rollers with which the lubricant can be more or less effectively removed from the glass plates, but is ultimately deposited uncontrollably again on the glass plates and/or the conveyor means so that the desired effect (increase of friction between the glass plate and conveyor means) is not guaranteed.

One possibility of disposing of removed lubricant is shown in FIG. 1 by a collecting tank 50 to which a negative pressure line (vacuum connection 51) can be assigned. It is also conceivable that belt brush 30 be arranged in a housing from which only upper strand 37 which engages the bottom of glass plate 10 looks out. A negative pressure means for exhausting the lubricant can be connected to the housing.

Belt brush 30 can also have brush belt 35 which consists of a continuous belt to which the bristles or bristle tufts are attached, pointing to the outside.

In summary, one embodiment of the invention can be represented as follows for example:

Belt brush 30 which engages the bottom of glass plate 10 to remove lubricant or other impurities is assigned to edge 24 of glass cutting table 20, the edge which is forward relative to the conveyor direction (arrow 11), in which table there are several conveyor belts (25) which transport glass plate 10 to be cut. Upper strand 37 of continuous brush belt 35 of belt brush 30, the strand which engages the bottom of glass plate 10, removes lubricant from the bottom of glass plate 10 so that the lubricant can be captured and disposed of on one end of belt brush 30 in tank 50 which can be pressurized with negative pressure.

I claim:

1. A device for conveying glass plates with a conveyor means comprising:

a continuous conveyor belt aligned parallel to a conveyor direction and engaging a large surface of a glass plate to be conveyed;

a glass cutting table; and a belt brush located forward of an end of said conveyor means and forward of said glass cutting table, said belt brush moving transversely to said conveyor direction and acting on a bottom surface of said glass plate facing said conveyor means to clean an area of said bottom surface prior to said area contacting said continuous belt, wherein said end is a forward end relative to said conveyor direction.

2. Device according to claim 1, wherein the conveyor means is horizontally aligned.

3. Device according to claim 1, wherein an upper strand (37) of a brush belt (35) of said belt brush (30) engages the bottom surface of said glass plate (10).

4. Device according to claim 1, further comprising plural independently driven belt brushes (30) aligned parallel to one another in succession.

5. Device according to claim 4, wherein each of said belt brushes (30) sweeps at least one part of a width of said glass plate (10) and said belt brushes (30) are arranged to clean different areas which overlap one another.

6. Device according to claim 1, further comprising a collecting device (50) for materials removed from said glass plate (10) positioned around an end of said belt brush (30).

7. Device according to claim 6, wherein said collecting device (50) is a tank.

8. Device according to claim 1, wherein said belt brush (30) further comprises a housing from which only said upper strand (37) of brush belt (35) which engages said bottom surface at said glass plate (10) projects.

9. Device according to claim 6, wherein said collecting device (50) has a connection (51) for a suction line which leads to a negative pressure means.

* * * * *